United States Patent
Lawson et al.

(10) Patent No.: US 9,840,234 B2
(45) Date of Patent: Dec. 12, 2017

(54) INFLATOR WITH REACTIVE TIRE PRESSURE MONITORING

(71) Applicant: Android Industries LLC, Auburn Hills, MI (US)

(72) Inventors: Lawrence J. Lawson, Troy, MI (US); Barry A. Clark, Ortonville, MI (US)

(73) Assignee: Android Industries LLC, Auburn Hills, MI (US)

( * ) Notice: Subject to any disclaimer, the term of this patent is extended or adjusted under 35 U.S.C. 154(b) by 210 days.

(21) Appl. No.: 14/454,575

(22) Filed: Aug. 7, 2014

(65) Prior Publication Data

US 2015/0047740 A1 Feb. 19, 2015

Related U.S. Application Data

(60) Provisional application No. 61/865,388, filed on Aug. 13, 2013.

(51) Int. Cl.
| | |
|---|---|
| *B60S 5/04* | (2006.01) |
| *G01L 17/00* | (2006.01) |
| *B60C 25/05* | (2006.01) |
| *B60C 25/14* | (2006.01) |

(52) U.S. Cl.
CPC .......... *B60S 5/046* (2013.01); *B60C 25/0515* (2013.04); *B60C 25/14* (2013.01); *B60C 25/145* (2013.04); *B60S 5/043* (2013.01); *G01L 17/00* (2013.01)

(58) Field of Classification Search
CPC .......... B60C 25/145; B60S 5/046; B60S 5/04
USPC ...................................... 141/38, 4
See application file for complete search history.

(56) References Cited

U.S. PATENT DOCUMENTS

| | | | |
|---|---|---|---|
| 5,035,274 A | 7/1991 | Kinnick et al. | |
| 5,168,911 A | 12/1992 | Gottschalk | |
| 5,884,659 A | 3/1999 | Prosser et al. | |
| 8,567,453 B2* | 10/2013 | Donnay | B25J 9/0084 141/38 |

(Continued)

FOREIGN PATENT DOCUMENTS

| | | |
|---|---|---|
| CN | 101281096 A | 10/2008 |
| FR | 2642011 A1 | 7/1990 |

(Continued)

OTHER PUBLICATIONS

English Translation of JP64016404, Schreiber Translations, Inc. May 2017.*

(Continued)

*Primary Examiner* — Timothy L Maust
*Assistant Examiner* — Timothy P Kelly
(74) *Attorney, Agent, or Firm* — Honigman Miller Schwartz and Cohn LLP (57) ABSTRACT

A wheel inflation apparatus including a wheel engagement unit that suspends a tire/wheel assembly and at least one inflation unit coupled to the robotic arm, each inflation unit being configured to inflate the tire/wheel assembly. A load measuring unit is configured to sense an amount of load being applied to the wheel/tire assembly. A controller is coupled to the load measuring unit for receiving a load signal and determining an internal air pressure of the tire/wheel assembly based on the load signal. The controller controls the at least one inflation unit based on the determined internal air pressure and a target (desired) air pressure value.

9 Claims, 6 Drawing Sheets

(56) References Cited

U.S. PATENT DOCUMENTS

2010/0263801 A1 10/2010 Lawson et al.
2012/0138190 A1* 6/2012 Lawson ................ B60C 25/132
                                                              141/38

FOREIGN PATENT DOCUMENTS

| JP | S64-16404U U | 1/1989 |
| JP | H11-129714 A | 5/1999 |
| JP | 2013-513517 A | 4/2013 |
| WO | WO-2013106568 A1 | 7/2013 |

OTHER PUBLICATIONS

Chinese Office Action for Chinese Application No. 201480044104.0 dated Nov. 2, 2016 (along with English translation).
International Search Report and Written Opinion for related Application No. PCT/US2014/050359 dated Nov. 5, 2014.
English Translation of Japanese Office Action for related JP Application No. 2016-534623 dated Dec. 19, 2016.

* cited by examiner

INFLATOR WITH REACTIVE TIRE PRESSURE MONITORING

RELATED APPLICATION

This U.S. patent application claims priority to U.S. Provisional Application 61/865,388 filed on Aug. 13, 2013.

TECHNICAL FIELD

This disclosure relates to an apparatus and method for inflating a wheel/tire assembly with reactive tire pressure monitoring.

BACKGROUND

A wheel/tire assembly can be assembled as part of automated process. During assembly, a robot can move a wheel to a mounting station, where the wheel is mounted onto the tire. The robot can also move the wheel with the tire mounted thereon, to an inflation station, where the wheel/tire assembly is inflated. The wheel/tire assembly can then be moved to a balancing station where the wheel/tire assembly is balanced. Each step takes time to perform and each station takes space in an assembly plant.

DESCRIPTION OF DRAWINGS

Like reference symbols in the various drawings indicate like elements.

DETAILED DESCRIPTION

Figure 1A:
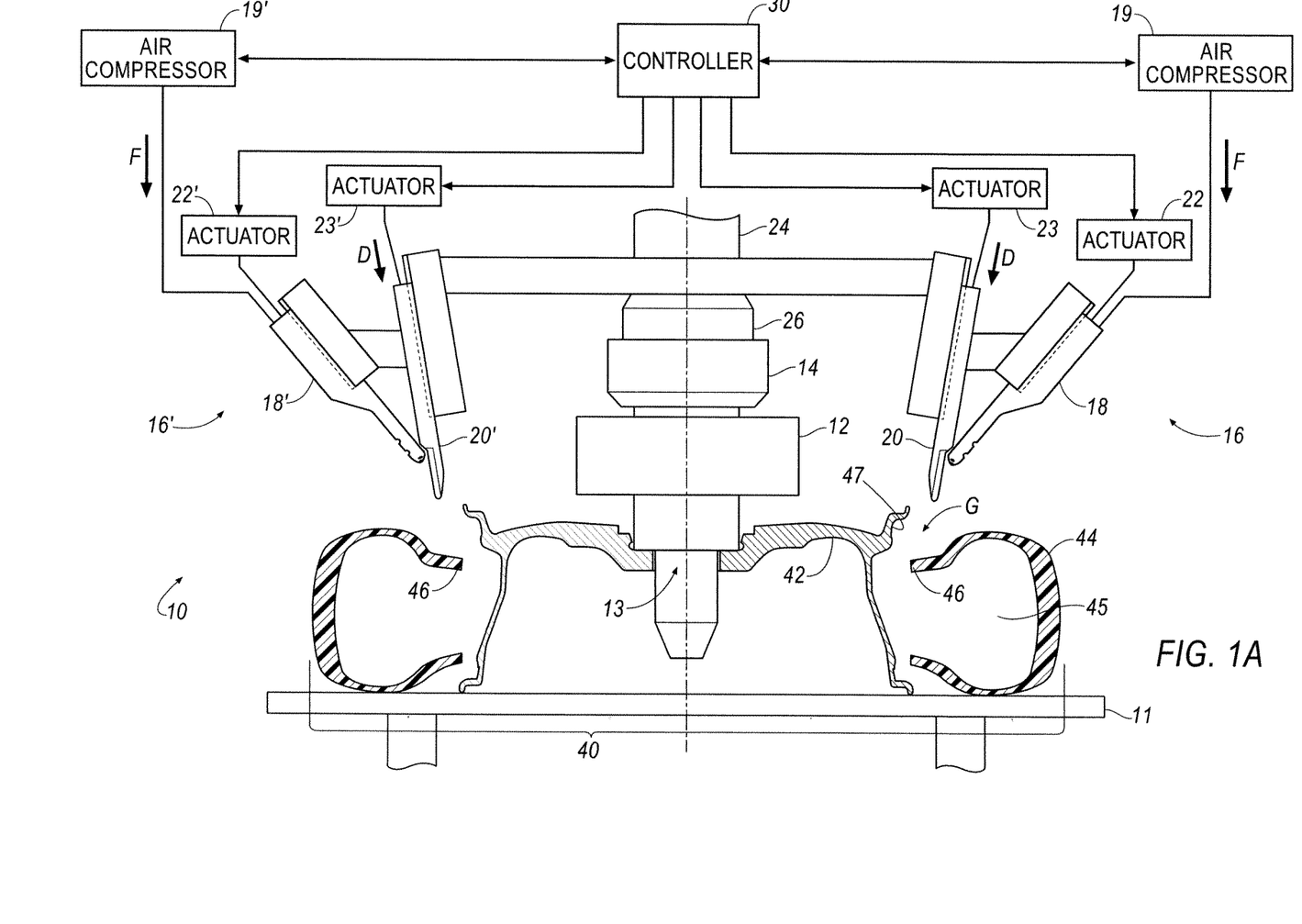
FIGS. 1A, 1B and 1C are schematic drawings illustrating example components of an inflator with reactive tire pressure monitoring.

FIG. 1A illustrates an example robotic inflator with reactive tire pressure mounting 10. According to some implementations, the inflator 10 includes a wheel engagement unit 12, a load cell 14, one or more inflation units 16, 16', a cylinder 24, a cylinder rod 26, and a controller 30. The inflator 10 can include additional or alternative components.

The wheel engagement unit 12 is configured to engage a wheel 42 of a wheel/tire assembly 40. A tire 44 is mounted onto the wheel 42 at a first station. The first station may be at a first location, or the first station (as well as other stations) may be movable with respect to the wheel/tire assembly 40 and the wheel engagement unit 12. Prior to or after the tire 44 is mounted onto the wheel 42, the wheel engagement unit 12 engages the wheel 42. In some implementations, the wheel engagement unit 12 includes one or more mechanisms 13 that are inserted into the center hub and/or the lug-nut holes. The wheel engagement unit 12 may include alternative or additional means for engaging the wheel 42. For example, the wheel engagement unit 12 may include magnetized screws or pins that are inserted into the center hub and/or the lug-nut holes or a magnetized surface that attracts the center hub. The engagement unit 12 is capable of grabbing and lifting the tire/wheel assembly 40 away from platform 11.

Figure 1B:
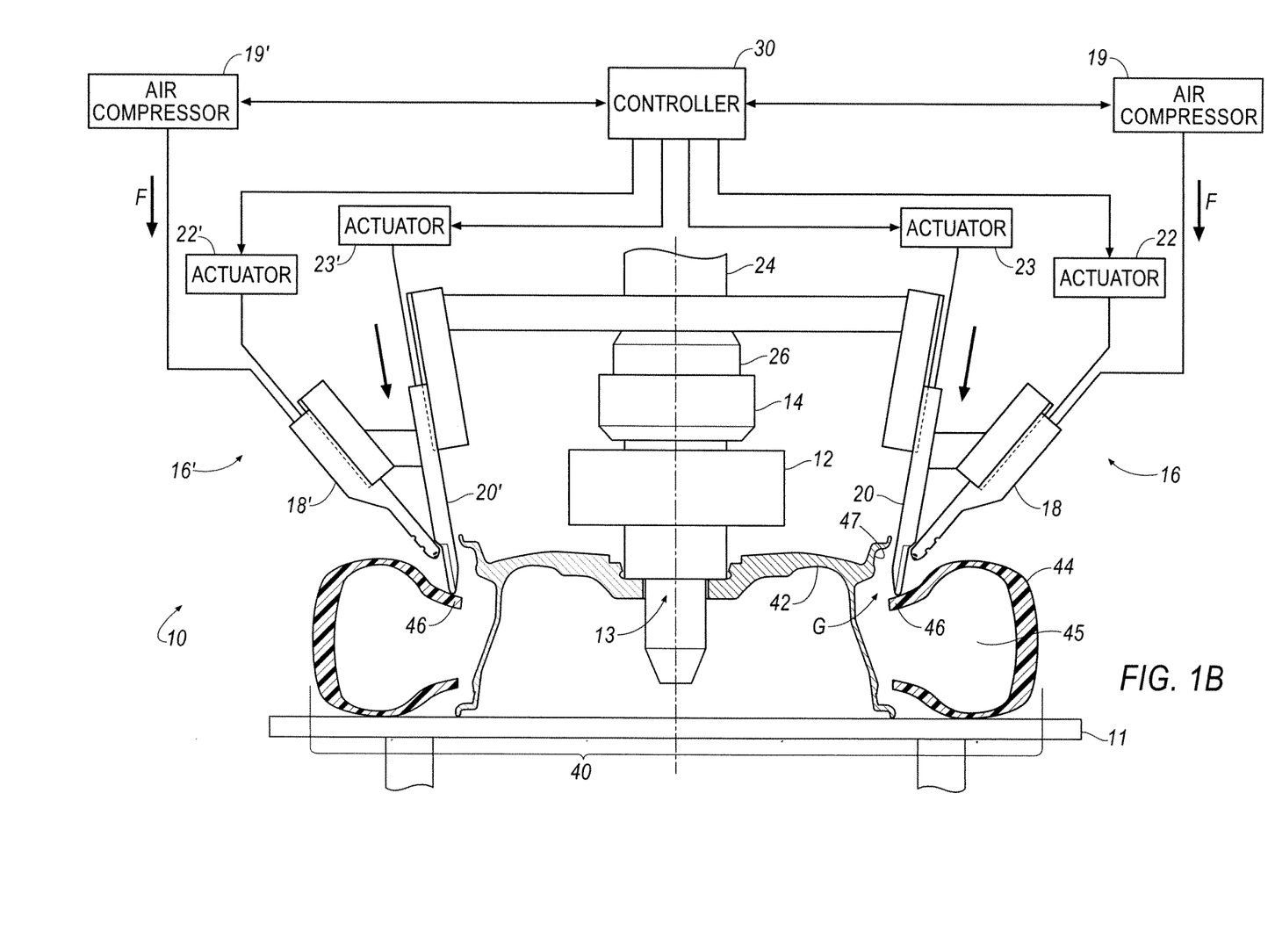
Figure 1C:
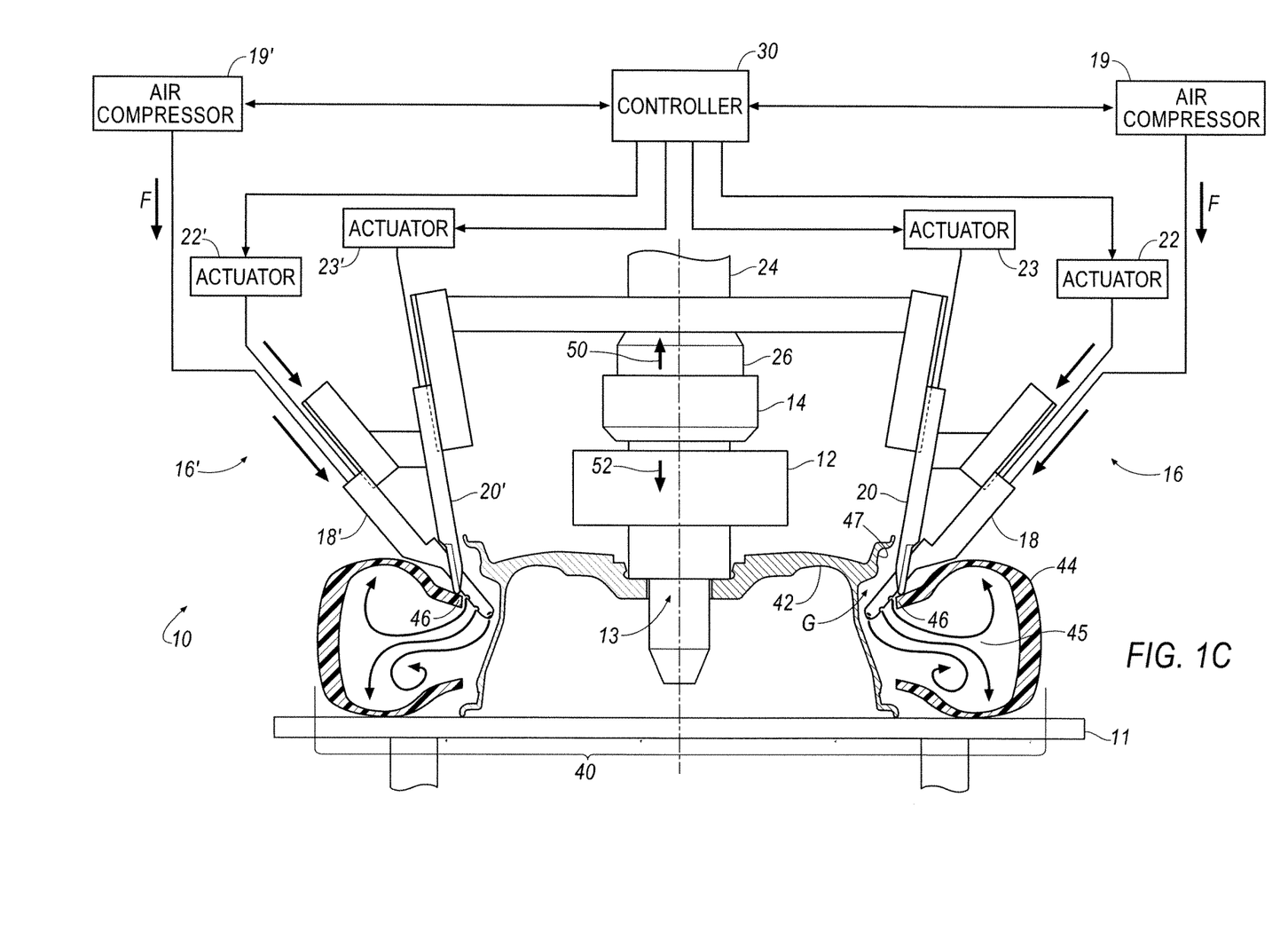

Each inflation unit 16, 16' is configured to inflate the wheel/tire assembly 40. In the illustrated example, the inflator 10 may include two inflation units 16, 16'. It is noted, however, that the inflator can include a single inflation unit 16 or more than two inflation units 16, 16' as well. In some implementations, each inflation unit 16, 16' includes an inflation probe 18, 18' (which is connected to a compressed air source such as an air compressor 19, 19' or similar device) a probe stirrup 20, 20' an inflator actuator 22, 22' and a stirrup actuator 23, 23'. The probe stirrup 20, 20' can include a cavity 21 (see, e.g., FIG. 3) that is larger in at least one dimension than the inflation probe 18, 18' thereby permitting the inflation probe 18, 18' to pass freely through the cavity 21. The probe stirrup 20, 20' can be made of a rigid material (e.g., steel) that can withstand the force of the tire 44 forcibly abutting the portion of the probe stirrup 20, 20' forming the cavity 21. In operation, the stirrup actuator 23, 23' can linearly actuate the probe stirrup 20, 20' at least along one axis into the tire/wheel assembly 40, such that the probe stirrup 20, 20' is inserted in a gap G between a bead seat 47 of the wheel 42 and a tire bead 46 of the tire 44. FIG. 1B illustrates an example where the probe stirrup 20, 20' has been inserted (by actuator 23, 23') into the gap G between the bead seat 47 of the wheel 42 and the tire bead 46 of the tire 44. Prior to the inflation of the wheel/tire assembly 40, the probe stirrup 20, 20' can be easily placed in between the tire bead 46 and the bead seat 47 of the wheel 42. Thereafter, the inflator actuator 22, 22' manipulates the inflation probe 18, 18' through the cavity 21 of the probe stirrup 20, 20'. In this way, the probe stirrup 20, 20' prevents the inflation probe 18, 18' from being pinched between the bead seat 47 of the wheel 42 and the tire bead 46 of the tire 44 as a result of the increasing internal air pressure of the tire 44 during inflation. FIG. 1C illustrates an example of the inflation probe 18, 18' being located in the cavity 21 of the probe stirrup 20, 20'. Once the inflation probe 18, 18' is inserted into the cavity of the probe stirrup 20, 20', the air compressor 19 can be commanded to begin pumping air into the wheel/tire assembly 40.

Figure 4:
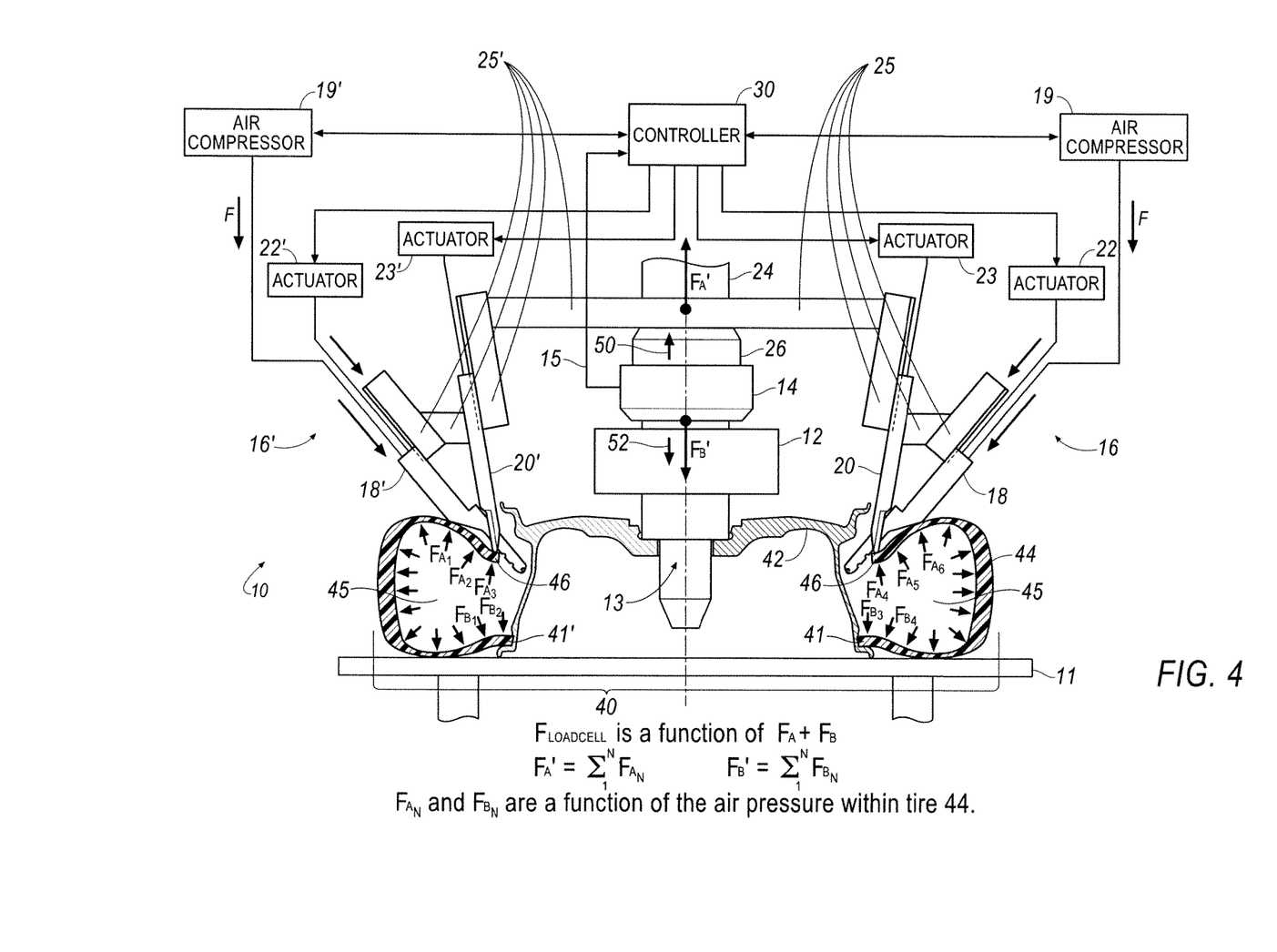
FIG. 4 is a schematic drawing of the force created during the inflation process and how those forces result on the strain sensed by load cell.

Now referring to FIG. 4, the load cell 14 outputs an electrical signal along conductor 15 indicating a measure of strain that is sensed across load cell 14 (i.e. $F'_A + F'_B$). The amount of strain that is sensed corresponds, in part, to the force $F'_A$ (exerted by the tire 44 against probe 18, 18' and probe stirrup 20, 20') and force $F'_B$ (exerted by the tire 44 against lower wheel bead seat 41, 41' of the wheel 42. The force exerted by the tire against the inflation probe 18, 18', the probe stirrup 20, 20' and the lower wheel bead seat 41, 41' is, at least in part, a function of the internal air pressure within wheel/tire assembly 40. In some implementations, the internal air pressure within cavity 45 of the wheel/tire assembly 40 results in an upward force being applied to the inflation probe 18, 18' and/or the probe stirrup 20, 20' as the wheel/tire assembly 40 is inflated. In these implementations, the upward force is transferred to the load cell 14 via rigid support structure 25, 25'. In some implementations, the upward force $F'_A$ may be transferred to the load cell 14 by way of the cylinder 24, which transfers the upward force to the cylinder rod 26. The cylinder rod 26 can transfer the upward force to the load cell 14. Additionally or alternatively, the air pressure within air cavity 45 of the wheel/tire assembly 40 may result in a downward force $F'_B$ being applied to the wheel/tire assembly 40 as the wheel/tire assembly 40 is inflated. The downward force is transferred to the wheel engagement unit 12, which in turn transfers the downward force onto the load cell 14. In this way, as the inflation probe 18, 18' inflates the wheel/tire assembly 40, the upward force and the downward force act simultaneously on the load cell 14. The arrows 50 and 52 depicted FIG. 1C are examples of the forces acting upon the load cell 14. The load cell 14 outputs a signal indicating a magnitude of the force. In an embodiment, inflation units 16, 16' are spaced apart from and do not contact any part of wheel 42. This spaced relationship (gap) enhances the accuracy of the system by eliminating any of the reaction force $F_{AN}$ from being drawn away from load cell 14. In an embodiment, during the inflation process, wheel engagement unit 12 is the sole means of supporting tire/wheel assembly 40 (i.e. platform 11 does not engage assembly 40).

The load cell 14 can measure the magnitude in any suitable manner. In some implementations, the load cell 14 includes a strain gauge that measures the magnitude of the force based on a change of resistance of a resistor when a force is applied and distorts the resistor. Additionally or alternatively, the load cell 14 can be a hydraulic load cell that measures the magnitude of the force based on a displacement of a liquid caused by the upward and downward forces acting upon the load cell.

The controller 30 can be one or more processors, microprocessors, and/or ASIC circuits that control operation of the inflator 10. In some implementations, the controller 30 executes machine-readable instructions for controlling the inflator 10. The controller 30 can control actuators 22, 22', 23, 23' and/or motors that cause the motion of the wheel engagement unit 12, the inflation unit 16, 16' the cylinder rod 26 and the cylinder 24. Furthermore, the controller 30 can determine the internal air pressure of the wheel/tire assembly 40 based on the output signal 15 of the load cell 14. In some implementations, the controller 30 determines the air pressure based on a lookup table. The look table can be generated heuristically, such that air pressure values can be correlated to various combinations of force measurements and/or tire parameters (e.g., tread type, tire type, wheel size). Additionally or alternatively, the air pressure can be determined according to a predetermined equation where air pressure is a function of the force measurement and, possibly, one or more tire parameters. When the internal air pressure reaches a threshold (e.g., 32 psi), the controller 30 commands the inflation unit 16, 16' to withdraw from the wheel/tire assembly 40.

In some implementations, the cylinder 24 mechanically moves the inflator 10 from a first position to a second position. The movement of the cylinder 24 can be controlled by one or more actuators or motors that move the cylinder 24 in one or more directions. For example, the cylinder 24 can be controlled by an actuator or motor to move the inflator 10 from a tire mounting station to a wheel balancing station. At the control of the actuator or motor, the cylinder 24 can raise and lower the wheel engagement unit 12 and can also move the wheel engagement unit 12 horizontally. In some implementations, the wheel/tire assembly 40 is inflated while the cylinder 24 is moving the wheel/tire assembly 40 from the first location to the second location. Additionally or alternatively, the cylinder 24 raises the wheel/tire assembly 40 and various stations (e.g., wheel mounting and wheel balancing stations) are moved to the location of the wheel/tire assembly 40. In these implementations, the inflation unit 16 inflates the wheel/tire assembly 40 while the cylinder 24 is raising the wheel/tire assembly 40.

In some implementations, the cylinder rod 26 raises and lowers the wheel engagement unit 12. Furthermore, in some implementations, the cylinder rod 26 also rotates the wheel engagement unit 12 to engage the hub and/or the lug-nut holes. The movement of the cylinder rod 26 can be controlled by one or more actuators and/or motors.

The inflator 10 of FIG. 1 is provided for example only. Alternate configurations of the inflator 10 are contemplated and are within the scope of the disclosure. For instance, the inflation unit 16, 16' may be configured to inflate the wheel/tire assembly 40 via an inflation valve (not shown) disposed along the wheel 42 or tire 44. In these implementations, the load cell 14 would operate in substantially the same manner, but the upward force would be transferred from the inflation valve.

Figure 2:
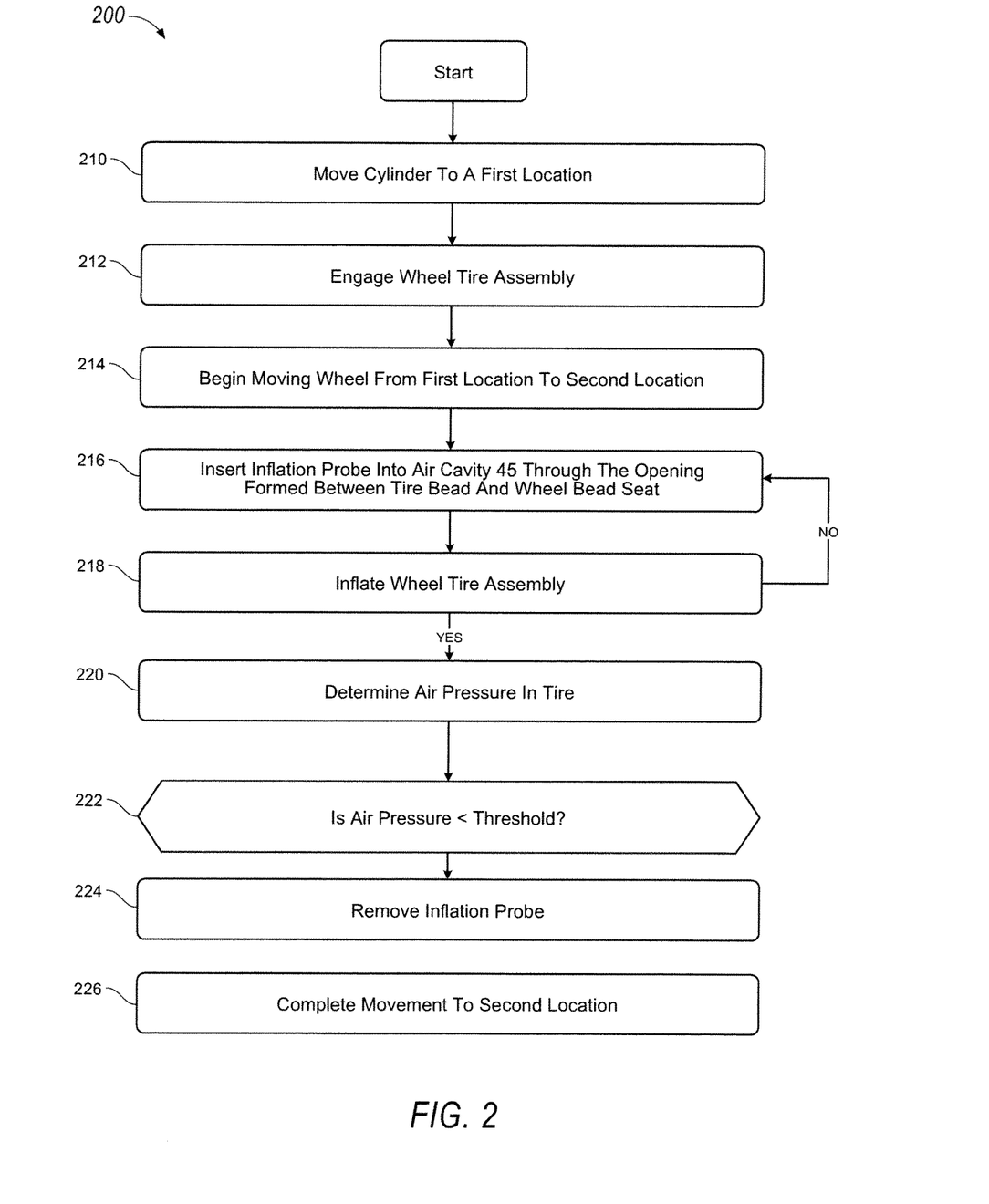
FIG. 2 is a flow chart illustrating an example set of operations for a method for operating a reactive tire pressure device.

FIG. 2 illustrates an example set of operations that can be performed by the controller 30 according to some implementations of the present disclosure. It is noted that in alternate configurations of the inflator 10, the operations may be varied accordingly.

At operation 210, the controller 30 commands an actuator or motor connected to the cylinder 24 to move the cylinder 24 to a first location. The first location may be a station on an assembly line of the wheel/tire assembly 40 (e.g., a tire mounting station).

At operation 212, the controller 30 causes the wheel engagement unit 12 to engage the wheel/tire assembly 40. The controller 30 can command the actuator and/or motor connected to the cylinder rod 26 to move the wheel engagement unit 12 into position to engage the wheel/tire assembly 40. Once the wheel engagement unit 12 is in position to engage the wheel/tire assembly 40, the controller 30 can command the actuator and/or motor connected to the cylinder rod 26 to move the wheel engagement unit 12 into an engaged position (e.g., rotate the wheel engagement unit 12 such that the wheel/tire assembly 40 is mounted onto the wheel engagement unit 12).

At operation 214, the controller 30 causes the cylinder 24 to begin moving the wheel/tire assembly 40 from the first location to a second location. The second location can be another station on the assembly line, such as a wheel balancing station. The controller 30 can move the wheel/tire assembly 40 by, for example, commanding an actuator or motor connected to the cylinder 24 to move the cylinder in a direction of the second location.

Figure 3:
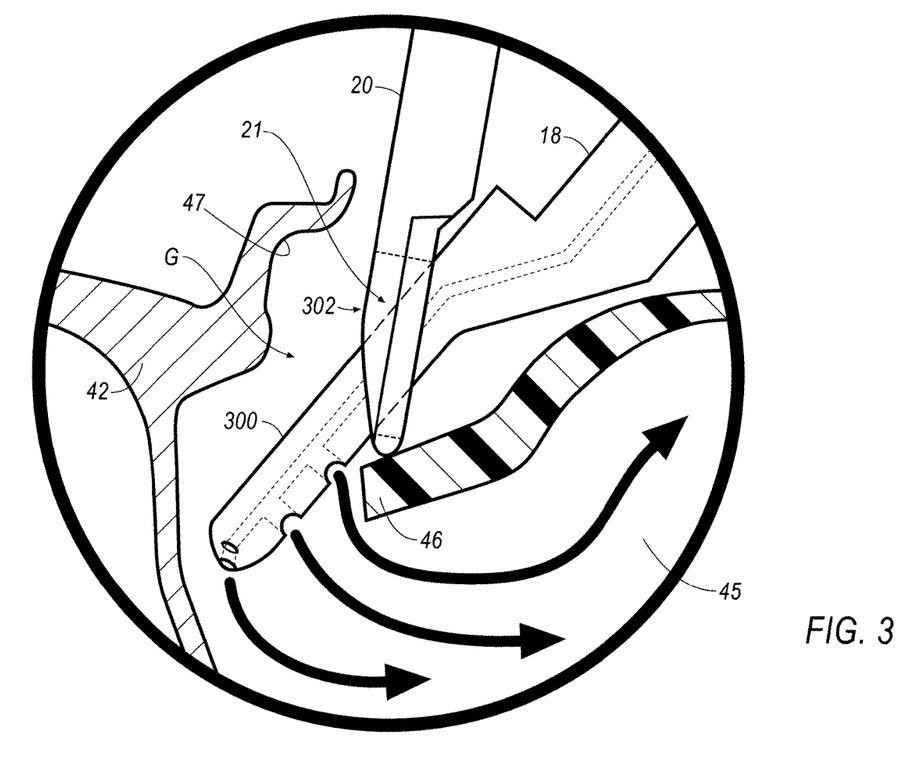
FIG. 3 is an enlargement showing the interaction of the inflation probe with its environment during the inflation process.

At operation 216, the controller 30 causes the inflation probe 18, 18' to be inserted into the wheel/tire assembly 40. In some implementations, the controller 30 commands the stirrup actuator 23, 23' to slide the probe stirrup 20, 20' into a position between the wheel 42 and the tire 44 (i.e., at the gap G between the bead seat 47 of the wheel 42 and the bead 46 of the tire 44). Once the probe stirrup 20, 20' is in position, the controller 30 commands the inflator actuator 22, 22' to move the inflation probe 18, 18' into the cavity 21 of the probe stirrup 20, 20'. Once, the inflation probe 18, 18' is in the cavity 21 of the probe stirrup 20, 20', the inflation probe 18, 18' is in position to inflate the tire 44. The foregoing operation can be performed for each inflation unit 16, 16'. FIG. 3 illustrates an example of the inflation probe 18, 18' being in position to inflate the wheel/tire assembly 40. As illustrated, a distal end 300 of the inflation probe 18, 18' is disposed in the cavity 21 of the probe stirrup 20, 20'.

At operation 218, the controller 30 commands the air compressor 19 to inflate the wheel/tire assembly 40.

At operation 220, the controller 30 can determine an air pressure in the wheel/tire assembly 40. In some implementations, the controller 30 receives the air pressure measure from the controller 30. In some implementations, the controller 30 receives a signal indicating the force being applied to the load cell 14 and calculates the air pressure based on the signal. The controller 30 can calculate the air pressure according to a lookup table or a predetermined equation.

At operation 222, the controller 30 determines whether the determined air pressure is less than a threshold. The threshold is indicative of a desired air pressure in the wheel/tire assembly 40. If the air pressure is less than the threshold, the controller 30 continues to command the air compressor 19 to inflate the wheel/tire assembly 40. Otherwise, when the air pressure equals or exceeds the threshold, the controller 30 causes the inflation probe 18, 18' to be removed from the wheel/tire assembly 40, as shown at operation 224. In some implementations, the controller 30 commands the inflation actuator 22, 22' to retract the inflation probe 16, 16' and then commands the probe actuator 23, 23' to retract the probe stirrup 20, 20'. At operation 226, the movement of the wheel/tire assembly 40 to the second location is completed. The controller 30 can continue to command the actuator or motor of the cylinder 24 to move the cylinder 24 until the wheel/tire assembly 40 reaches the second location. The controller 30 may further command the wheel engagement unit 12 to disengage the wheel/tire assembly 42.

Variations of the method 200 are contemplated and are within the scope of the disclosure. Furthermore, depending on the assembly of the inflator 10 (e.g., whether the wheel/tire assembly 10 is moved from a first station to a second station or whether the first station and the second station are movable with respect to the wheel/tire assembly 40), some operations may be varied, replaced, or removed.

What is claimed is:

1. A method comprising:
   disposing a first end of at least one inflation unit adjacent a sidewall of a tire of a tire-wheel assembly;
   arranging a load cell between a wheel hub engaging portion of a wheel engagement unit and a first end of a cylinder rod of the wheel engagement unit;
   connecting a second end of the at least one inflation unit to a second end of the cylinder rod, wherein the first end of the cylinder rod is opposite the second end of the cylinder rod;
   inflating the tire-wheel assembly with the at least one inflation unit;
   during inflation, simultaneously monitoring:
      a first force applied to the load cell; and
      a second force applied to the load cell, wherein the second force is in a direction that is opposite that of the first force;
   determining an internal air pressure of the tire-wheel assembly based on the monitored amounts of the first force and the second force; and
   determining whether to continue inflating based on the determined internal air pressure.

2. The method of claim 1, further comprising:
   engaging the tire-wheel assembly prior to the inflating; and
   moving the tire-wheel assembly from a first location to a second location, wherein the inflating is performed during the moving.

3. The method of claim 1, wherein determining the internal air pressure includes looking up the internal air pressure from a look up table that associates air pressure values with varying force measurements.

4. The method of claim 3, wherein the look up table further associates air pressure values with parameters corresponding to different types of one of more of a plurality of wheels, tires, and tire-wheel assemblies.

5. The method of claim 1, where each inflation unit includes a probe stirrup and an air inflation probe, the air inflation probe being insertable into the probe stirrup.

6. The method of claim 5, wherein the first force applied to the load cell is a downward force, wherein the second force applied to the load cell is an upward force such that the downward force and the upward being in substantially opposite in directions results in the load cell being a tensile sensor.

7. A method comprising:
   connecting a first end of a load cell to a wheel engagement unit;
   connecting a second end of the load cell to a rigid support structure that supports at least one inflation unit, wherein the second end of the load cell is opposite the first end of the load cell;
   engaging a wheel of a tire-wheel assembly with the wheel engagement unit;
   engaging a sidewall of a tire of the tire-wheel assembly with the at least one inflation unit;
   inflating the tire-wheel assembly with the at least one inflation unit;
   during inflation, simultaneously monitoring:
      a first force applied to the first end of the load cell imparted by the wheel engagement unit; and
      a second force applied to the second end of load cell imparted by the rigid support structure, wherein the second force is in a direction that is opposite that of the first force; and
   determining an internal air pressure of the tire-wheel assembly based on the monitored amounts of the first force and the second force.

8. The method of claim 7, further comprising the step of:
   determining whether to continue inflating based on the determined internal air pressure.

9. The method of claim 8, wherein the first force applied to the load cell is a downward force, wherein the second force applied to the load cell is an upward force such that the downward force and the upward being in substantially opposite in directions results in the load cell being a tensile sensor.

* * * * *